(12) United States Patent
Bedell

(10) Patent No.: US 6,758,978 B1
(45) Date of Patent: Jul. 6, 2004

(54) DEEP BED THICKENER/CLARIFIERS WITH ENHANCED LIQUID REMOVAL

(75) Inventor: Daniel Bedell, Centerville, UT (US)

(73) Assignee: GL&V Management Hungary KFT., Egressy ut 26 (HU)

( * ) Notice: Subject to any disclaimer, the term of this patent is extended or adjusted under 35 U.S.C. 154(b) by 89 days.

(21) Appl. No.: 10/049,214

(22) PCT Filed: Jul. 26, 2000

(86) PCT No.: PCT/US00/20334
§ 371 (c)(1),
(2), (4) Date: Feb. 5, 2002

(87) PCT Pub. No.: WO01/10530
PCT Pub. Date: Feb. 15, 2001

Related U.S. Application Data
(60) Provisional application No. 60/147,652, filed on Aug. 6, 1999.

(51) Int. Cl.$^7$ ............................................... B01D 21/06
(52) U.S. Cl. ................. 210/715; 803/805; 803/197; 803/207; 803/528; 803/532.1; 803/540
(58) Field of Search ............................. 210/712, 715, 210/803, 805, 197, 207, 528, 532, 538, 540, 523

(56) References Cited

U.S. PATENT DOCUMENTS

| | | | |
|---|---|---|---|
| 1,526,197 A | * | 2/1925 | Ahlqvist |
| 1,686,203 A | * | 10/1928 | Coe |
| 1,718,871 A | * | 6/1929 | Nordell |
| 2,253,878 A | | 8/1941 | Weber |
| 2,370,356 A | * | 2/1945 | Kamp et al. ................ 210/197 |
| 2,460,834 A | | 2/1949 | Logue |
| 2,473,297 A | | 6/1949 | Parker |
| 2,570,304 A | * | 10/1951 | Bach |
| 3,353,676 A | * | 11/1967 | Hirsch ...................... 210/528 |
| 3,473,661 A | * | 10/1969 | Dupp ........................ 210/528 |
| 3,616,910 A | | 11/1971 | Gericke |
| 4,802,671 A | | 4/1978 | Kelly |
| 4,120,791 A | | 10/1978 | Wright |
| 4,142,970 A | | 3/1979 | Von Hagel et al. |
| 4,217,916 A | | 8/1980 | Emmett, Jr. et al. |
| 4,222,879 A | | 9/1980 | Hill |
| 4,247,400 A | | 1/1981 | King et al. |
| 4,271,027 A | | 6/1981 | Kelly |
| 4,290,898 A | | 9/1981 | Von Hagel et al. |
| 4,392,955 A | * | 7/1983 | Soriente ..................... 210/197 |
| 4,681,683 A | | 7/1987 | Lindstol |
| 4,830,507 A | | 3/1989 | Bagatto et al. |
| 4,999,115 A | | 3/1991 | Peterson |
| 5,433,862 A | | 6/1995 | Batson |
| 5,549,827 A | | 8/1996 | Batson |
| 5,800,715 A | | 9/1998 | Baston |

FOREIGN PATENT DOCUMENTS

EP 585103 * 3/1994

* cited by examiner

*Primary Examiner*—Christopher Upton
(74) *Attorney, Agent, or Firm*—R. Neil Sudol; Henry Coleman; William Sapone

(57) ABSTRACT

The enhanced deliquifying of the compacted bed of deep bed thickener/clarifier is disclosed. Such an apparatus comprises a vessel receiving a slurry of liquid and solid particles suspended in the liquid. The vessel defines a free settling zone, a hindered settling zone intermediate, an upper clarification zone and a lower compaction zone. A deliquifying member is provided in the vessel extending up between at least two zones for facilitating the upward flow of free liquid from one of the lower zones and the settling of particulates. A rotating rake shaft with pickets are so designed to release the interstitial liquid trapped in a lower zone. The pickets provide pathways for liquid to release generally vertically. The release liquid travels upward to the deliquifying member and on into the clarification zone. The lower zone, freed of the interstitial water, further collapses becoming more concentrated or dense.

23 Claims, 3 Drawing Sheets

DEEP BED THICKENER/CLARIFIERS WITH ENHANCED LIQUID REMOVAL

This application claims the benefit of provisional application Ser. No. 60/147,652 filed Aug. 6, 1999.

BACKGROUND OF THE INVENTION

This invention relates to clarifiers and thickeners of the deep bed type. This invention also relates to an associated method for separating liquid and solid particles in a suspension of slurry in thickness and clarifiers.

Deep bed thickeners and clarifiers (or so-called thickener/clarifier devices) are shown and described, for example, in U.S. Pat. Nos. 5,433,862, 5,549,827 and 5,800,715, the disclosures of which are hereby incorporated by reference herein.

The device described in U.S. Pat. No. 5,433,862 comprises a vessel receiving a slurry of liquid and solid particles suspended on the liquid. The vessel defines a hindered settling zone in which the liquid and solids of the slurry tend to separate with the solids settling down into a compaction zone below the hindered settling zone. In the compaction zone, the solids concentration tends to increase, while the liquid phase rises to a clarification zone above the hindered settling zone. An overflow launder adjacent the upper end of the vessel receives the overflow phase of the slurry separated in the vessel. An underflow discharge port toward the bottom of the vessel receives the thickened or underflow phase of the slurry separated in the vessel. One or more so-called separating members are provided in the vessel extending upwardly from a lower end in the hindered settling or compaction zones to an upper end in a clarification zone. Preferably, this member includes cones or other downwardly inclined surfaces that facilitate both the settling of solids down to the compaction zone and the upward flow of free liquid from the hindered settling and/or compaction zone to the clarification zone.

The deep bed thickener or clarifier device described in U.S. Pat. No. 5,800,715 is similar to that disclosed in U.S. Pat. No. 5,433,862, but further has a fluid flow barrier between the overflow clarification zone and the other zones of the vessel, and one or more clarifying conduits extending through the barrier. Each such conduit carries a suspended floc bed of particulate solids that filters and further clarifies the liquid flowing up from the hindered settling zone to the clarification zone. This further filtering removes solid particles that would otherwise be carried along the "clarified" liquid to the overflow launder. These clarification conduits thus serve a significantly different purpose than do the separating members and function independently thereof.

Deep bed thickener/clarifiers offer certain design and operational advantages over the conventional thickeners and clarifiers while providing clarity of overflow and solids concentration of underflow comparable to that of conventional thickener/clarifiers. Such thickeners and clarifiers are typically of low-profile design (i.e., shorter in height but of much greater diameter than deep bed thickeners), but like deep bed thickeners have generally central feedwells and underflow underflow discharge ports.

Conventional low profile thickeners rely on the radial expanse of the horizontal settling zones to effect settling of the slurry throughout the thickener. To achieve this settling action, the influent feed is typically dispersed radially outwardly from the central feedwell and rotating rake arms, having generally plow shaped blades, gather and laterally direct the settled solids along the thickener/clarifier bottom to the central discharge opening in the bottom of the thickener/clarifier tank. These rake blades are located closely adjacent the tank bottom and are designed to move the solids across the tank bottom with minimal disruption in the downward (or settling) flow pattern of the slurry though the hindered settling and compaction zones. Consistent with this purpose, the rakes are rotated at a very slow speed for example, less than 1 revolution per minute. U.S. Pat. Nos. 4,082,671, 4,217,916 and 4,271,027, for example, describe and illsutrate rake assemblies that perform this function of moving settled solids across the tank bottom of conventional low-profile thickeners for discharge at a central underflow outlet. Indeed, some of the rake assemblies are intended to scrape the settled solids from the tank bottom, see U.S. Pat. No. 4,247,400.

In contrast, "deep bed" thickener/clarifiers rely on the height of the hindered settling to cause separation of the slurry into its clarified liquid and settled solids phases. Deep bed thickeners/clarifiers further have a deep, high angle conical bottom for directing the settled solids toward the discharge opening. Thus there is no need for rotating rakes to move the solids within the thickener/clarifier to effect removal of the solids. Indeed, rakes would serve little purpose in moving the solid, but rather would add expense and operating complexity.

Basically, deep bed thickeners rely on a conical tank bottom having a sidewall extending an angle from horizontal generally greater than the angle of repose of the settled solids to direct the solids to move by gravity alone along the tank bottom to the discharge opening. This eliminates the need for a rotating rake and thereby simplifies the operation and construction of the thickener/clarifier as well as reduces the cost of the thickener/clarifier compared to conventional thickeners/clarifiers. This cost reduction takes the form of the elimination of a capital expenditure for the rake assemblies, as well as the elimination of the associated torque driveheads and motors (often in excess of 1,000,000 foot pounds torque) and high strength bridges spanning the tank top to support the drive.

In contrast, conventional low profile thickener/clarifiers have tank bottoms that are flat or inclined at angles generally below the angle of repose of the settled solids and thus require rake assemblies and the associated drive and bridge (or column) structures to remove the settled solids from the thickener/clarifier.

SUMMARY OF THE INVENTION

The present invention enhances liquid-solids separation in a deep bed thickener/clarifier and thus produces an underflow product or sludge which is thickened relative to that of existing deep bed thickeners/clarifiers.

More particularly, the deep bed thickener/clarifier of this invention provides for the release and removal of free or interstitial liquid (typically water) trapped in the settled solids in the hindered settling zone and/or the compaction zone. This release of liquid is effected without increasing the size of the thickener/clarifier, disturbing the settling processes or the naturally occurring movement of the solids along the conical tank bottom.

The deep bed thickener/clarifier of the present invention comprises a vessel with an overflow launder and an underflow discharge port. The vessel has an inlet for receiving a slurry of a liquid and solid particles suspended in the liquid. In an upper portion of the vessel, a free settling zone has a low concentration of solid slurry particles, while in a lower portion of the vessel, a compaction zone has a high concentration of solid slurry particles. The overflow launder is attached to the vessel adjacent an upper end thereof for discharge of an overflow phase of the slurry that has been separated in the vessel. The underflow discharge port is adjacent to a bottom thereof for discharge of a thickened, underlow phase of the slurry that has been separated in the vessel.

An upper portion of the vessel holds the free settling zone and a lower portion of the vessel holds the compaction zone. A hindered settling zone extends between the free settling and compaction zones, with the hindered settling zone and compaction zone constituting lower settling zones. A deliquifying member is positioned in the vessel extending up from adjacent the lower portion of the vessel to adjacent the upper portion of the vessel for flow of liquid from at least one of the lower zones to the free settling zone. The deliquifying member further serves to isolate this flow of liquid from the flow of slurry down in the lower settling zones. A rake assembly is mounted for rotation in the lower portion of the vessel, with the rake assembly forming channels in the slurry held in the lower portion of the vessel for releasing liquid in at least one of said lower settling zones to flow to the deliquifying member and on to the free settling zone.

The method of this invention for operating a deep bed thickener/clarifier comprises, in accordance with the present invention feeding, into a vessel, a slurry of a liquid and solid particles suspended in the liquid and separating the slurry by gravity into different zones having respective degrees of liquid-solids separation including, at an upper portion of the vessel, a free settling zone having a low concentration of solid slurry particles and further including, at a lower portion of the vessel, a compaction zone having a high concentration of solid slurry particles. A hindered settling zone is positioned between these zones. The method also comprises discharging, into an overflow launder attached to the vessel proximately to an upper end thereof, an overflow phase of the slurry that has been separated in the clarification zone and discharging, via an underflow discharge port fixed to the vessel at least proximately to a bottom thereof, a thickened, underflow phase of the slurry that has been separated in the vessel. Liquid is directed from at least one of the lower settling zones to the free settling zone via a flow path which is isolated from the flow of slurry down in the vessel in the lower settling zones. In accordance with his invention, upwardly, extending channels are formed in the slurry held in the lower portion of the vessel to release liquid in at least one of the lower settling zones to flow to the isolated flow path and then to the free settling zone.

Other objects of the invention will be in part apparent and in part described and shown in the following description of the drawings and preferred embodiments.

BRIEF DESCRIPTION OF THE DRAWINGS

For detailed understanding of the present invention, reference should be made to the following detailed description of the preferred embodiments, taken in conjunction with the accompanying drawings, in which like elements have been given like numerals and wherein.

DESCRIPTION OF THE PREFERRED EMBODIMENTS

Figure 1:
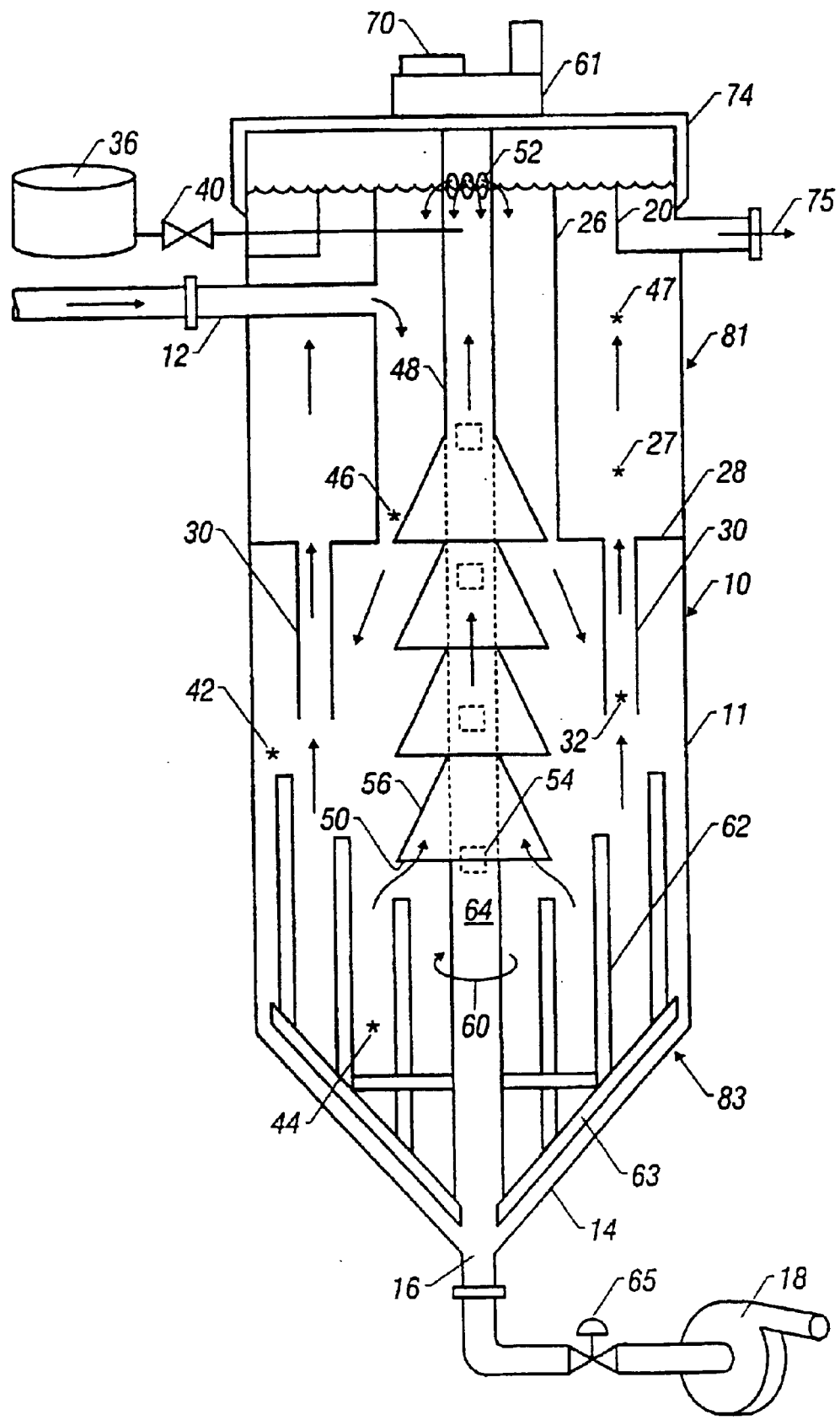
FIG. 1 illustrates a vertical section of the thickener/clarifier of this invention and its various components including the deliquifying member and a rake assembly.

As illustrated in FIG. 1, a deep bed thickener/clarifier of this invention, generally indicated at 10, comprises a vessel 11 having an inlet 12 receiving a slurry comprising liquid and solid particles suspended in the liquid. The slurry components are separated in vessel 11 into a relatively light-weight overflow phase (i.e., a primarily clarified liquid) and a relatively heavy underflow phase (i.e., a primarily high solid concentration). Vessel 11 includes a downwardly tapering frusto-conical bottom 14 having an apex (not designated) connected to an underflow discharge port 16 for the discharge of the thickened, underflow phase of the slurry that has been separated in vessel 11. A variable speed pump and motor 18 communicate via a valve 65 with discharge port 16 for the controlled removal of the underflow from vessel 11. Alternatively, a remotely actuated valve (not shown) may be provided as a mechanical end use device at discharge port 16 to control the removal of the underflow.

The thickener/clarifier 10 further includes an overflow weir or launder 20 for removal of the overflow phase separated from the slurry in vessel 11. An upper lip (not designated) of launder 20 defines the upper level of the clarified liquid. A cylindrical wall 26 in vessel 11 forms an annular chamber 27 and defines a fluid barrier between the annular chamber and the remainder of the vessel interior. Projecting through a lower wall or panel 28 of annular chamber 27 is one or more elongate conduits 30 having generally vertically extending sidewalls which support fluidized floc beds 32 of the particulate material suspended in the different conduits, as described in greater detail in U.S. Pat. No. 5,800,715. Two such conduits 30 are shown in FIG. 1. However, other vessel designs may have only one such conduit or more than two conduits. Conduits 30 are shown to be of square or circular shape in section, but may be of any shape in section.

To facilitate flocculation in vessel 11, a settling agent such as a polyelectrolyte may be delivered as an additive to the slurry or as shown in FIG. 1 preferably to the free settling liquid in the vessel. As shown in FIG. 1. a source of settling agent such as a storage tank 36 is in fluid flow communication with the vessel 11. A fluid flow control device, such as a remotely actuated valve 40, regulates the dosage of settling aid delivered to the slurry and thus control the extent of floc formation within vessel 11.

The slurry received and held in vessel 11 separates by gravity into a hindered settling zone 42 which is located above a compaction zone 44 and below an interior free settling clarification zone 46 and an overflow clarification zone 47 in annular chamber 27. Within hindered settling zone 42, the liquid and solid particles tend to separate with the solid particles tending to flow downwardly to the compaction zone 44 and with the clarified liquid flowing up to clarification zone 47. Within compaction zone 44 the solids concentration increases to the highest level of concentration at discharge port or outlet 16 at the vessel bottom.

As described in U.S. Pat. No. 5,433,862, a deliquifying member 48 extends up within vessel 11 from generally adjacent the compaction zone 44. Deliquifying member 48 is of generally tubular configuration and receives free liquid released from compaction zone 44 and delivers the liquid to the upper end of the deliquifying member 48 which is preferably positioned at the interior free settling clarification zone 46. At its upper end, deliquifying member 48 is provided with openings 52 for feeding expressed liquid to the free settling clarification zone 46. In the thickener/ clarifier of FIG. 1, the deliquifying member 48 also serves as part of a rotary drive member or rake shaft as described more fully hereinafter.

Figure 3:
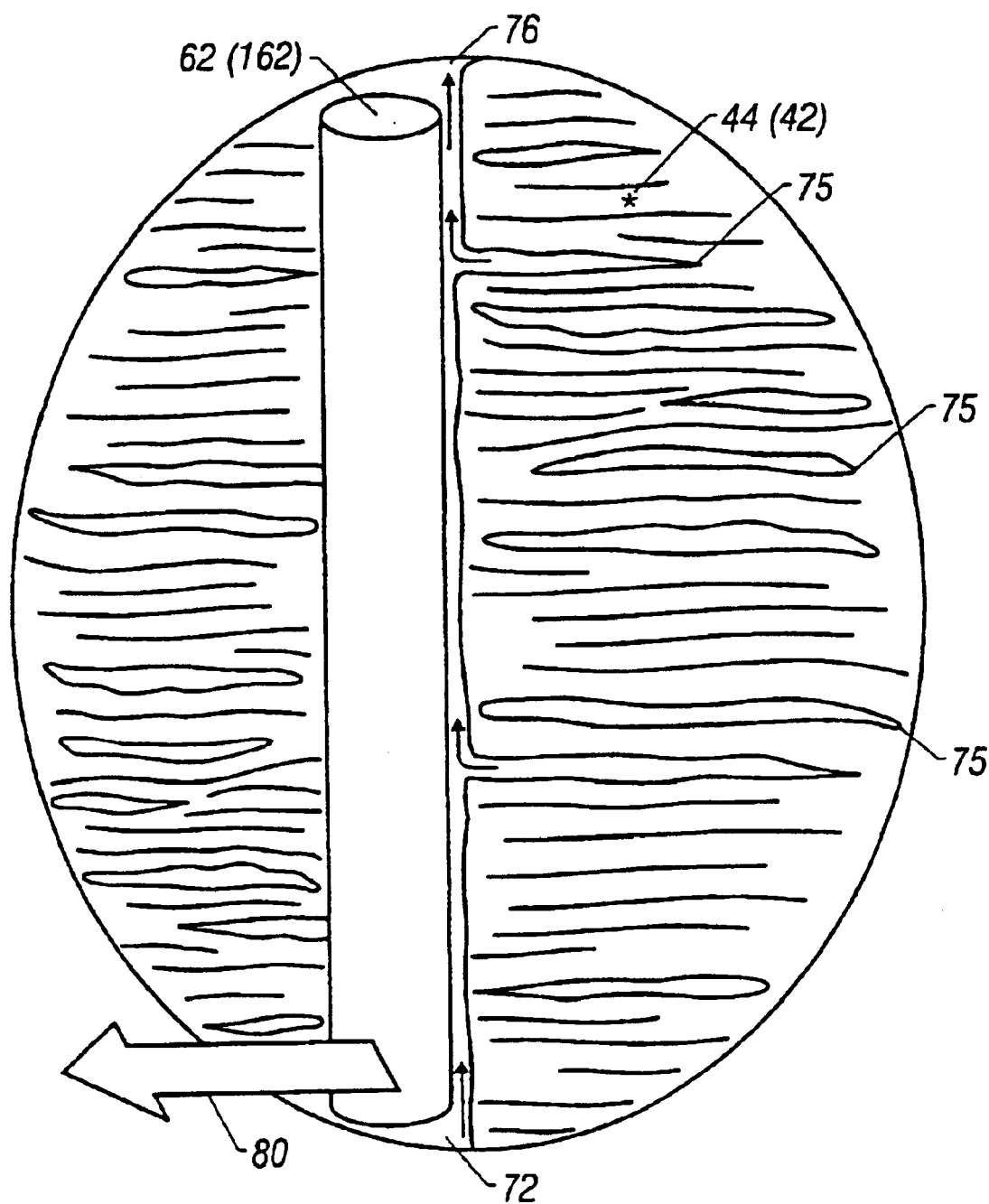
FIG. 3 illustrates the enlarged detail of a rake picket in the slurry for forming a water flow channel in the slurry.

The vessel comprises an upper portion, indicated generally at 81, holding at least a portion of the free settling zone 46 and a lower portion, indicated generally at 83, holding at least a portion of the compaction zone 44. The hindered settling zone 42 may extend into either the upper or lower portion of the vessel. The compaction zone 44 and hindered settling zone 42 constitute lower settling zones. The deliquifying member 48 in the vessel extends up from the lower portion 83 of the vessel to the upper portion 81 of the vessel for flow of liquid from at least one of the lower settling zones to the free settling zone while isolating the flow of liquid from the flow of slurry down into the lower settling zone. A rake assembly 63 is mounted for rotation as indicated at 60 in the lower portion 83 of the vessel and has a plurality of generally vertical pickets 62. As shown in FIG. 3, as the rake assembly rotates the pickets 62 travel through the slurry, see arrow 80, and form temporary channels 76 in the slurry held in the lower portion of the vessel. These channels release free or interstitial liquid in pockets 75 in at least one of the lower settling zones to flow along generally vertical paths 72 to the deliquifying member 48. From there, the liquid is free to flow on to the free settling zone 46. The deliquifying member 48 supports and rotates the rake assembly 63. At its upper end, deliquifying member 48 is operatively connected to a motor 70 via a drivehead 61. The motor 70 may be of fixed or variable speed, and use any suitable motive power, such as an electric or hydraulic motor or a combustion engine.

Accordingly, the deliquifying member 48 facilitates removal of free liquid from at least one of the lower zones to enable solids in the compaction zone to increase to a higher concentration level and to do so more rapidly than would otherwise be possible. The deliquifying member 48 is open to hindered settling zone 42 to facilitate release of free liquid from that zone. To that end. deliquifying member 48 is provided with one or more suitable inclined members such as upwardly tapering conical deliquifying baffles 56 shown, for example, in FIG. 1 as being ganged in a sequence. Each conical deliquifying baffle 56 is open at a lower end 50 and guides released liquid upwardly along an inner surface (not shown) to a respective opening or aperture 54 provided in deliquifying member 48. Settling solids particles are directed along the outer surfaces of conical deliquifying baffles 56 towards the bottom of vessel 11. Thus the deliquifying member 48 isolates the upward flow of liquid from the downward flow of the slurry.

Deliquifying member 48 provides a conduit for the flow of free liquid thus released from hindered settling zone 42 and compaction zone 44. This channeling of the released liquid in those zones influences the solids settling rate therein. Deliquifying member 48 is shown to be a tube of circular or square cross-section. However, deliquifying member 48 may be of other shapes as described and shown in U.S. Pat. No. 5,433,862. The word "tubular" is used herein to mean a hollow profile of any suitable cross-sectional shape.

In operation, deliquifying member 48 is rotated at a slow rate during the gravity settling process. The consequent movement of the pickets 62 through the thickened slurry or sludge in the lower zones releases otherwise trapped interstitial liquid 71. This freed liquid 71 generally escapes from compaction zone 44 in laminar flow paths along pickets 62, as illustrated in FIG. 3. The overall process of thickening or clarification in apparatus 10 is controlled by adjusting the underflow withdrawal and overflow discharge rates relative to the inlet. Thickener/clarifier 10 as provided with a rotatable rake assembly 63 provides for higher underflow solids concentration, improved overflow clarity, increased rate of influent feed, reduced settling aid usage or any combination of these advantages or results than would be possible in treating slurries in conventional deep bed or low-profile, large diameter thickener/clarifiers.

Thickener/clarifier 10 includes a cover plate or upper panel 74 which carries drivehead 61 and motor 70. An outlet port 75 is provided at the upper end of vessel 11 for discharging the clarified liquid phase which spills over weir or launder 20. The deliquifying member 48 is rotatably suspended from cover plate or upper panel 74.

Figure 2:
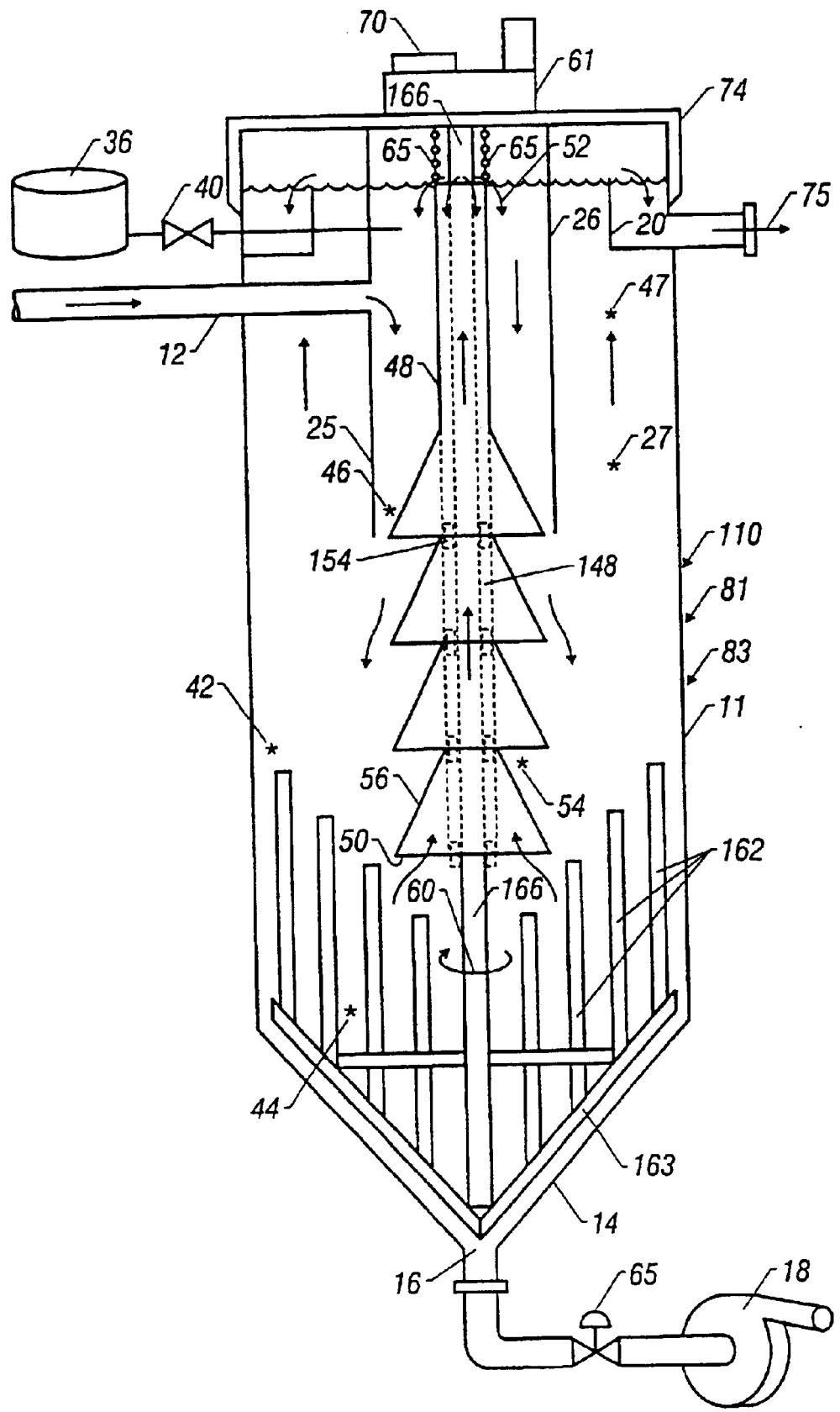
FIG. 2 illustrates a vertical section of a second thickener/clarifier of this invention with the rake shaft passing through the inside of the deliquifying member.

FIG. 2 depicts a second embodiment of the thickener/clarifier 110 Which includes certain modifications with respect to the apparatus of FIG. 1. Like structures in FIGS. 1 and 2 are designated with the same reference numerals.

In FIG. 2, the deliquifying member 148, unlike the deliquifying member 48 in FIG. 1, does not serve to rotate the rake assembly and may be rigidly fixed to cover or upper panel 74. The deliquifying member 148 is also shown to terminate at an upper end of a lowermost conical deliquifying baffle 56.

Thickener/clarifier 110 includes a rotatable rake 163 having a plurality of generally parallel vertically extending pickets 162. Rake 163 serves to augment or accelerate the deliquifying of the lower zones. Rake 163 is rotated by a drive shaft 166 which is generally coaxially and longitudinally disposed in deliquifying member 148. Drive shaft 166 is rotatably journaled in cover plate or upper panel 74 and is operatively connected to drivehead 61 and motor 70.

The upper three conical deliquifying baffles 56 communicate with a lumen or interior (not designated) of fluid flow member 148 via openings or apertures 154 provided in tubular fluid flow member 148. As discussed above, settling solids particles are directed along the outer surfaces of conical deliquifying baffles 56 towards the bottom of vessel 11.

The embodiment of FIG. 2 also differs from that of FIG. 1 in not incorporating clarification tubes (such as tubes 30) and in directing flocculant to the free settling zone at the exterior of the deliquifiing member 148.

Although the invention has been described in terms of its preferred embodiments, those skilled in the an will recognize that numerous modifications and changes may be made while remaining within the scope and spirit of the invention. For example, pickets 62 and 162 of rakes 63 and 163, respectively extend parallel to one another vertically through compaction zone 44 and into hindered settling zone 42. Pickets 62 and 162 may be attentively inclined at an angle to the vertical. In addition, conical deliquifying baffles 56 may be greater or fever in number than four. The conical deliquifying baffles located below chamber 27 may be larger. In addition, the pickets may be positioned and be of sufficient length to extend into both the compaction zone 44 and hindered settling zone 42. The deliquifying member 48, 148 may be open only adjacent its lower end to receive liquid from one of the lower zones and adjacent its upper end to discharge liquid conveyed by the member. Alternatively, the member may be open at a plurality of locations as well as for a substantial portion of its length.

Accordingly, it is to be understood that the drawings and description herein be offered by way of example to facilitate comprehension of the invention and should not be construed to limit the scope thereof.

What is claimed is:

1. A thickener/clarifier, comprising:

(a) a vessel having an inlet for receiving a slurry of a liquid and solid particles suspended in the liquid, said vessel having an upper portion holding a free settling zone having a relatively low concentration of solid slurry particles and having a lower portion holding a compaction zone having a relatively high concentration of solid slurry particles and a hindered settling zone between said compaction zone and said free settling zone, with said compaction zone and said hindered settling zone constituting lower settling zones;

(b) an overflow launder adjacent said upper end of said vessel for discharge of an overflow phase of the slurry that has been separated in said vessel;

(c) an underflow discharge port adjacent said bottom of said vessel for discharge of a thickened, underflow phase of the slurry that has been separated in said vessel;

(d) a deliquifying member in said vessel extending up from said lower portion of said vessel to said upper portion of said vessel for flow of free liquid released from at least one of said lower settling zones to said free settling zone while isolating said flow of liquid from the flow of slurry down in said lower settling zones; and (e) a rake assembly mounted for rotation in said lower portion of said vessel, with said rake assembly having at least one elongated generally vertical picket forming channels in the slurry held in said lower portion of said vessel for releasing liquid in at least one of said lower settling zones to flow to said deliquifying member and on to said free settling zone.

2. The thickener/clarifier of claim 1 wherein said rake assembly further includes a rotary drive for rotation of said rake assembly about a generally vertical axis.

3. The thickener/clarifier of claim 2 wherein said rotary drive is disposed at the upper end of said vessel, said rotary drive being connected to said rake assembly via an elongate drive member extending vertically down into said vessel.

4. The thickener/clarifier of claim 3 wherein said drive member is of tubular configuration for at least a portion of its length to receive liquid released from a lower settling zone.

5. The thickener/clarifier of claim 3 wherein said drive member is received in a tubular member surrounding said shaft, said tubular member receiving liquid released from a lower settling zone.

6. The thickener/clarifier of claim 1 wherein said rake assembly includes a plurality of pickets extending generally parallel to one another.

7. The thickener/clarifier of claim 6 wherein said pickets extend into the compaction zone.

8. The thickener/clarifier of claim 7 wherein said deliquifying member is open adjacent its lower end to receive liquid from at least one of said lower settling zones and said at least one of said picket extends below said opening adjacent a lower end of said deliquifying member.

9. The thickener/clarifier of claim 7 wherein said at least of said picket is positioned with its upper end below a lower end of said deliquifying member.

10. The thickener/clarifier of claim 7 wherein said pickets extend into both said compaction zone and said hindered settling zone.

11. The thickener/clarifier of claim 1 wherein said deliquifying member is open adjacent its lower end to receive liquid from at least one of said lower settling zones and is open adjacent its upper end to discharge liquid conveyed by said deliquifying member to said free settling zone.

12. The thickener/clarifier of claim 11 wherein said deliquifying member is open to receive liquid for a substantial portion of its length.

13. The thickener/clarifier of claim 11 wherein said deliquifying member is a tube with fluid flow openings therein.

14. The thickener/clarifier of claim 13 wherein said deliquifying member has openings at spaced locations along its length.

15. The thickener/clarifier of claim 14 wherein said deliquifying member has inclined members extending over said openings in said deliquifying member in said lower portion of said vessel.

16. The thickener/clarifier of claim 11 wherein said deliquifying member further comprises an inclined member extending over the opening in said deliquifying member adjacent its lower end.

17. The thickener/clarifier of claim 16 wherein said inclined member comprises a conical baffle.

18. A method of operating a thickener/clarifier having an upper portion and a lower portion comprising;

(a) feeding a slurry of a liquid and solid particles suspended in the liquid into a vessel;

(b) separating said slurry by gravity into different zones having respective degrees of liquid-solids separation including, at a upper portion of said vessel, a free settling zone having a relatively low concentration of solid slurry particles and further including, at a lower portion of said vessel, a compaction zone having a relatively high concentration of solid slurry particles and a hindered settling zone between said free settling zone and said compaction zone, with said hindered zone and said compaction zone constituting lower settling zones;

(c) discharging an overflow phase of the slurry that has been separated in said vessel into an overflow launder adjacent to an upper end of said vessel;

(d) discharging, via an underflow discharge adjacent a bottom of said vessel, a thickened, underflow phase of the slurry that has been separated in said vessel;

(e) directing free liquid released from at least one of said lower settling zones to flow up to said free settling zone via a flow path isolated from the flow of the slurry down in said vessel in said lower settling zones; and (f) forming generally upwardly extending channels in the slurry held in said lower portion of said vessel to release liquid in at least one of said lower settling zones to flow to said isolated flow path and then on to said free settling zone.

19. The method of claim 18 further comprising moving a rake assembly in said lower portion of said vessel.

20. The method of claim 19 wherein said rake assembly is rotated about a generally vertical axis.

21. A thickener/clarifier, comprising:

(a) a vessel having an inlet for receiving a slurry of a liquid and solid particles suspended in the liquid, said vessel having an upper portion surrounding a free settling zone having a relatively low concentration of solid slurry particles and having a lower portion surrounding a compaction zone having a relatively high concentration of solid slurry particles, and a hindered settling zone between said compaction zone and said free settling zone, with said compaction zone and said hindered settling zone constituting lower settling zones and having means for releasing liquid from at least one of said lower settling zones;

(b) an overflow launder adjacent said upper end of said vessel for discharge of an overflow phase of the slurry that has been separated in said vessel;

(c) an underflow discharge port adjacent said bottom of the vessel for discharge of a thickened, underflow phase of the slurry that has been separated in said vessel;

(d) a deliquifying member in said vessel extending up from said lower portion of said vessel to said upper portion of said vessel for flow of free liquid to said free settling zone released from at least one of said lower settling zones while isolating said flow of liquid from the flow of slurry down in said lower settling zones; and (e) an injector for injecting flocculant into the flow of water to said free settling zone to facilitate settling of solid particles in the water.

22. The thickener/clarifier of claim 21 wherein the injector extends into said deliquifying member.

23. The thickener/clarifier of claim 21 wherein said deliquifying member includes an opening adjacent its upper end for discharge of liquid into said free settling zone and said injector is positioned adjacent said opening in said deliquifying member.

* * * * *